US006339984B1

(12) United States Patent
Sugioka et al.

(10) Patent No.: US 6,339,984 B1
(45) Date of Patent: Jan. 22, 2002

(54) PISTON FOR FLUID MACHINES

(75) Inventors: Takahiro Sugioka; Takayuki Kato; Masato Takamatsu, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/484,355

(22) Filed: Jan. 18, 2000

(30) Foreign Application Priority Data

Jan. 20, 1999 (JP) .......................................... 11-011567
Oct. 27, 1999 (JP) .......................................... 11-305542

(51) Int. Cl.[7] ................................................ F16H 19/00
(52) U.S. Cl. ........................................................ 92/248
(58) Field of Search ............................................ 92/248

(56) References Cited

U.S. PATENT DOCUMENTS 2,387,181 A * 10/1945 Procter ........................ 92/245
4,306,489 A * 12/1981 Driver et al. ................. 92/212
4,462,302 A 7/1984 Hertell ........................ 92/248
5,022,313 A * 6/1991 Shontz et al. ................. 92/248
5,094,148 A * 3/1992 Haber et al. .............. 92/248 X
5,282,412 A * 2/1994 Ebbing ...................... 92/248 X
5,947,001 A * 9/1999 Evans, Jr. et al. ........ 92/248 X

FOREIGN PATENT DOCUMENTS

JP 57-129962 8/1982
JP 3-260402 11/1991
JP 5-99146 4/1993
JP 05-099145 4/1993
JP 05-099146 4/1993
JP 06-037580 5/1994
JP 10-205440 8/1998

* cited by examiner

*Primary Examiner*—John E. Ryznic
(74) *Attorney, Agent, or Firm*—Morgan & Finnegan, LLP

(57) ABSTRACT

Pistons, which are reciprocated by a swash plate of a compressor, have two separate parts joined together. Each piston has a body and a coupler. The coupler is connected to the swash plate. The body is made of thermosetting resin. The body is molded to the coupler. Accordingly, the piston body to be firmly connected to the coupler.

21 Claims, 4 Drawing Sheets

PISTON FOR FLUID MACHINES

BACKGROUND OF THE INVENTION

The present invention relates to a piston for fluid machines such as compressors that compress refrigerant gas for air-conditioning vehicles.

Japanese Unexamined Patent Publication No. 5-99146 describes a compressor piston 112 illustrated in the present specification at FIG. 6, which replicates the figure shown in the abstract of the Japanese reference and adds a leading one (1) digit to the reference numerals for parts described herein. As shown in FIG. 6 of the present specification, the resin piston body 130 is compression-molded to and joined to a metal coupler 120, to which a piston rod 113 is coupled. Since most of the piston 112 is made of resin, the piston 112 is relatively light. The light piston reduces inertia when the piston 112 reciprocates. As a result, power losses of the compressor are reduced.

However, in the publication, the piston body 130 is made of fluororesin such as polytetrafluoroethylene, which is a thermoplastic resin. Since such thermoplastic resin has poor adhesion to metal, the coupler cannot be joined to the piston with desirable strength.

In a typical compressor, rotation of a swash plate is converted into piston reciprocation through shoes. Each piston includes a body and a coupler, which are joined. Each piston is coupled to the swash plate through the shoes, which are retained in the coupler to slide freely.

In the typical compressor, force is applied to each piston through the shoes and the coupler by the swash plate. This causes frictional resistance between each piston and the wall of the corresponding cylinder bore. Accordingly, a torsional force is applied to the interface between each piston body and coupler. As a result, the metal couplers may be detached from the piston bodies, which are made of thermoplastic resin. This hinders smooth reciprocation of the pistons and damages the seal between the pistons and the cylinder bores.

SUMMARY OF THE INVENTION

An objective of the present invention is to provide a piston for fluid machines that allows the piston body to be firmly connected to the coupler.

To achieve the above objective, the present invention provides a piston for cooperating with a driving body in a machine. The piston comprises a metal coupler connected to the driving body. A body is made of thermosetting resin. The body is molded to the coupler.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 3(*b*) is an exploded view of the injection mold of FIG. 3(*a*);

FIG. 5(*b*) is a side view of an insert in a third embodiment;

FIG. 5(*c*) is a side view of an insert in a fourth embodiment; and

DETAILED DESCRIPTION OF THE PREFERRED EMBODIMENTS

A piston for compressors for air-conditioning vehicles according to a first embodiment of the present invention will now be described with reference to FIGS. 1–4.

Figure 1:
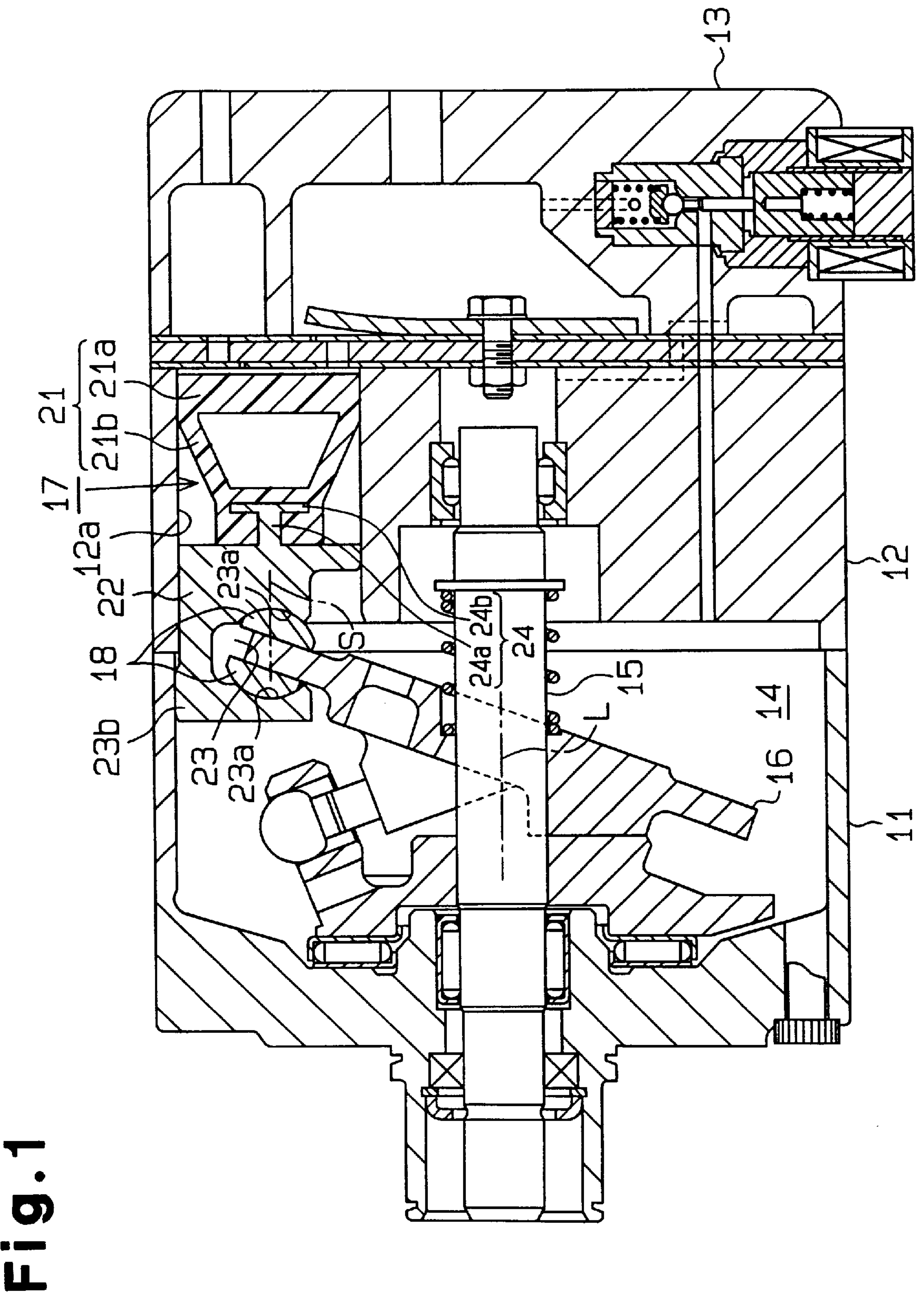
FIG. 1 is a cross-sectional view of a compressor according to a first embodiment of the present invention.

As shown in FIG. 1, a front housing member 11 and a rear housing member 13 are coupled to a cylinder block 12. A crank chamber 14 is defined between the front housing member and the cylinder block 12. The front housing member 11, the cylinder block 12, and the rear housing member 13 form the compressor housing.

A drive shaft 15 passes through the crank chamber 14 and is rotatably supported between the front housing member and the cylinder member. The drive shaft 15 is coupled to an engine (not shown) through a clutch mechanism such as an electromagnetic clutch. The engine serves as an external drive source. Accordingly, the drive shaft 15 rotates when the clutch is connected during the operation of the engine.

A swash plate 16 is coupled to the drive shaft 15 to rotate integrally with the drive shaft 15 in the crank chamber 14. Cylinder bores 12*a* are formed in the cylinder block 12. The cylinder bores 12*a* are parallel to the axis L of the drive shaft 15 and are equally spaced about the axis L.

Single head pistons 17 are respectively accommodated in the corresponding cylinder bores 12*a*. Each piston 17 is coupled to the swash plate 16 through a pair of shoes 18. Rotation of the drive shaft 15 is converted into reciprocation of each piston 17 through the swash plate 16 and the shoes 18. Reciprocation of each piston 17 compresses refrigerant gas in the corresponding cylinder bore 12*a*. In the present embodiment, the drive shaft 15, the swash plate 16, and the shoes 18 form a driving mechanism.

All of the pistons 17 are identical, thus the following description will refer to only one of the pistons 17 for simplicity.

Figure 2:
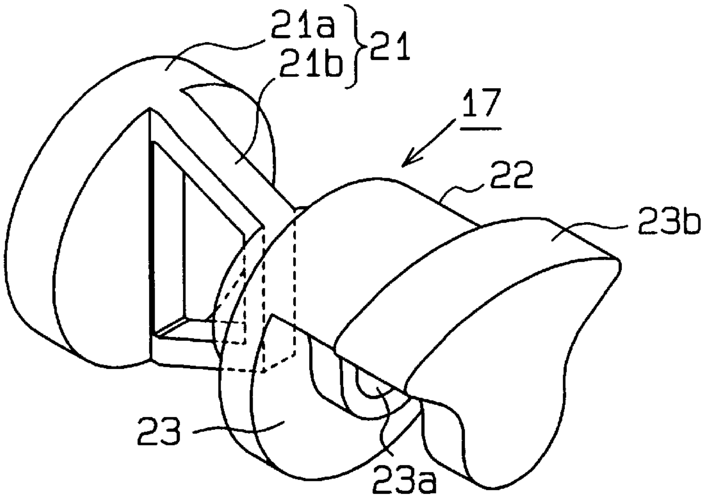
FIG. 2 is a perspective view of a piston in the compressor of FIG. 1.

As shown in FIGS. 1 and 2, the piston 17 includes a resin body 21 and a metal coupler 22. The body 21 is joined to the coupler 22.

The coupler 22 is made of metal (Al—Si alloy), which is an aluminum containing 7–13 percent of silicon by weight. The coupler 22 is produced by forging or casting. Using aluminum for the coupler 22 reduces the weight of the piston 17. Adding silicon reduces friction between the piston 17 and the inner surface of the corresponding cylinder bore 12*a* and between the piston 17 and the shoes 18.

A recess 23 is formed in the proximal end of the coupler 22. A pair of sockets 23*a* are formed on the opposed inner surfaces of the recess 23. A pair of shoes 18 are supported in the sockets 23*a* to hold the periphery of the swash plate 16. Accordingly, the shoes 18 transmit the alternating inclination of the swash plate 16 to the piston 17, which reciprocates the piston 17 axially (along axis S).

An anchor 24 is integrally formed on the coupler 22. As shown in FIG. 1, the anchor 24 includes a support shaft 24*a* and a flange, or a disc 24*b*. The support shaft 24*a* extends from center of the end surface of the coupler 22 toward the body 21. The disc 24*b* is supported by the support shaft 24*a*. The diameter of the disk 24*b* is greater than that of the support shaft 24*a*. The body 21 is joined to the coupler 22 and receives the anchor 24.

The coupler 22 of each piston 17 has a partially cylindrical rotation restrictor 23*b*. The curvature of the restrictor's cylindrical portion is greater than that of each cylinder bore 12*a*. The center of curvature of each rotation restrictor 23*b* is displaced from the center of curvature of the corresponding cylinder bore 12*a*. As each piston 17 reciprocates, the associated rotation restrictor 23*b* slides along the inner surface of the front housing 11 while preventing the piston 17 from rotating about the axis S.

The body 21 includes a columnar head 21*a* and a pair of struts 21*b*. The head 21*a* slides along the surface of the corresponding cylinder bore 12*a*. The struts 21*b* extend diagonally from the head 21*a* to the coupler 22. A trapezoidal hole is formed between the struts 21*b* to make the piston 17 light.

Figure 3A:
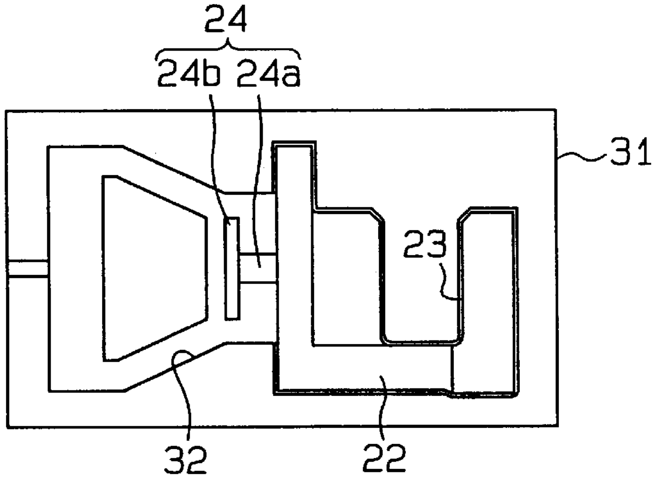
FIG. 3(*a*) is a side view of one half of an injection mold containing a coupler.
Figure 3B:
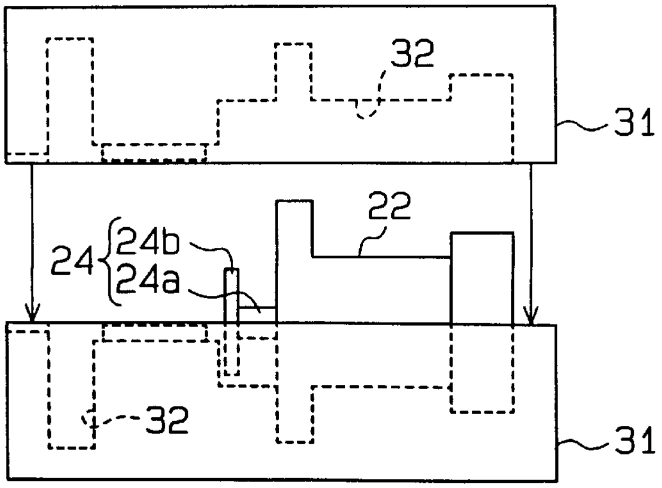

FIGS. 3(*a*) and 3(*b*) shows an injection mold 31. A cavity 32 is formed in the mold 31. The coupler 22 is placed in the rear portion of the cavity 32. Part of an end surface of the coupler 22 and the anchor 24 are exposed to a front portion of the cavity 32, which defines the body 21. A molding material including a heated phenol resin, which is a thermosetting resin, and glass fibers, which serve as reinforcing material, is injected into the cavity 32 for forming the body 21. Accordingly, the front portion of the cavity 32 is filled with the molding material. The molding material, when solidified, fixes the end surface of the coupler 22 and the anchor 24 to the body 21.

Figure 4:
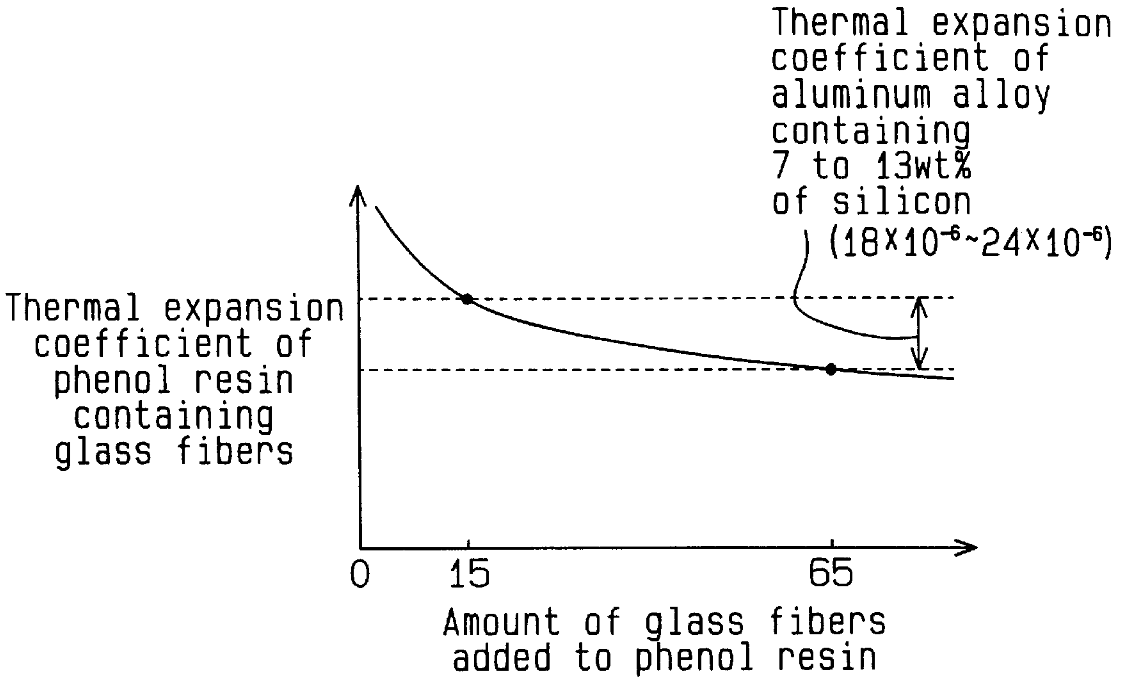
FIG. 4 is a graph showing the proportion of glass fiber (by weight) contained in a piston body in relation to the thermal expansion coefficient.

As shown in the graph of FIG. 4, the thermal expansion coefficient of a phenol resin containing a relatively small amount of glass fibers is greater than that ($18*10^{-6}$ to $24*10^{-6}$) of an aluminum alloy containing 7–13 weight percent of silicon, which forms the coupler 22. The thermal expansion coefficient of a phenol resin becomes smaller as the proportion of glass fibers contained in the phenol resin increases. Accordingly, adjusting the proportion of glass fibers contained in the phenol resin makes the thermal expansion coefficient of the body 21 substantially equal to that of the metal coupler 22. That is, the proportion of glass fibers contained in the phenol resin is adjusted within a range of 15–65 weight percent to correspond to aluminum alloy containing 7–13 weight percent of silicon.

The illustrated embodiment has the following advantages.

A driving force is applied to each body 21 through the shoes 18 and the coupler 22. This causes frictional resistance between the body 21 and the surface of the cylinder bore 12*a*. Accordingly, a shearing stress which is based on the rotation of the swash plate 16 and reciprocation of the piston 17 is applied to the juncture between the body 21 and the coupler 22.

However, in the present embodiment, thermosetting resin is used to form the body 21. Thermosetting resin has better adhesion to metal than thermoplastic material does. Accordingly, the coupler 22 is more firmly joined to the body 21 than in the prior art. Adhesion between the body 21 and the coupler 22 can withstand the torsional force.

Thermosetting resin is more heat-resistant than thermoplastic resin is. Accordingly, the body 21 is not softened by heat generated by friction between the piston 17 and the surface of the cylinder bore 12*a*. Therefore, firm adhesion between the body 21 and the coupler 22 is maintained. As a result, the piston 17 smoothly slides in the cylinder bore 12*a*, and good seal between the piston 17 and the cylinder bore 12*a* is maintained.

Adding reinforcing material hardens the thermosetting resin and increases the durability of the body 21.

Adjusting the proportion of reinforcing material contained in the body 21 alters the thermal expansion coefficient of the body 21 to substantially match that of the coupler 22. Accordingly, the thermal expansion due to friction heat in the body 21 is substantially equal to that of the coupler 22. This prevents internal stresses based on a difference in thermal expansion from being generated at the juncture between the body 21 and the coupler 22. Therefore, the adhesion between the body 21 and the coupler 22 is stable.

The resin of the body 21 fills the space between the disc 24*b* and an end surface of the coupler 22. The disc 24*b* is perpendicular to the axis S of the piston 17, which prevents axial movement of the body 21 relative to the coupler 22. Accordingly, if the adhesion between the body 21 and the coupler 22 is weakened, separation of the body 21 from the couple 22 is prevented, which maintains the operation of the compressor.

Further embodiments of the present invention will now be described focusing on differences from the first embodiment shown in FIGS. 1–4.

Figure 5A:
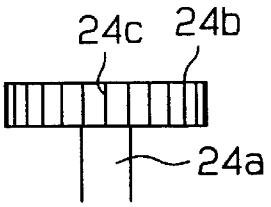
FIG. 5(*a*) is a side view of an insert in a second embodiment.
Figure 5B:
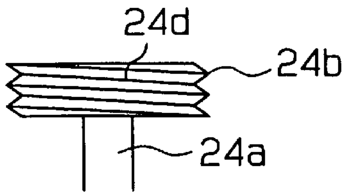
Figure 5C:
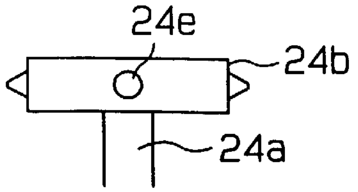
Figure 6:
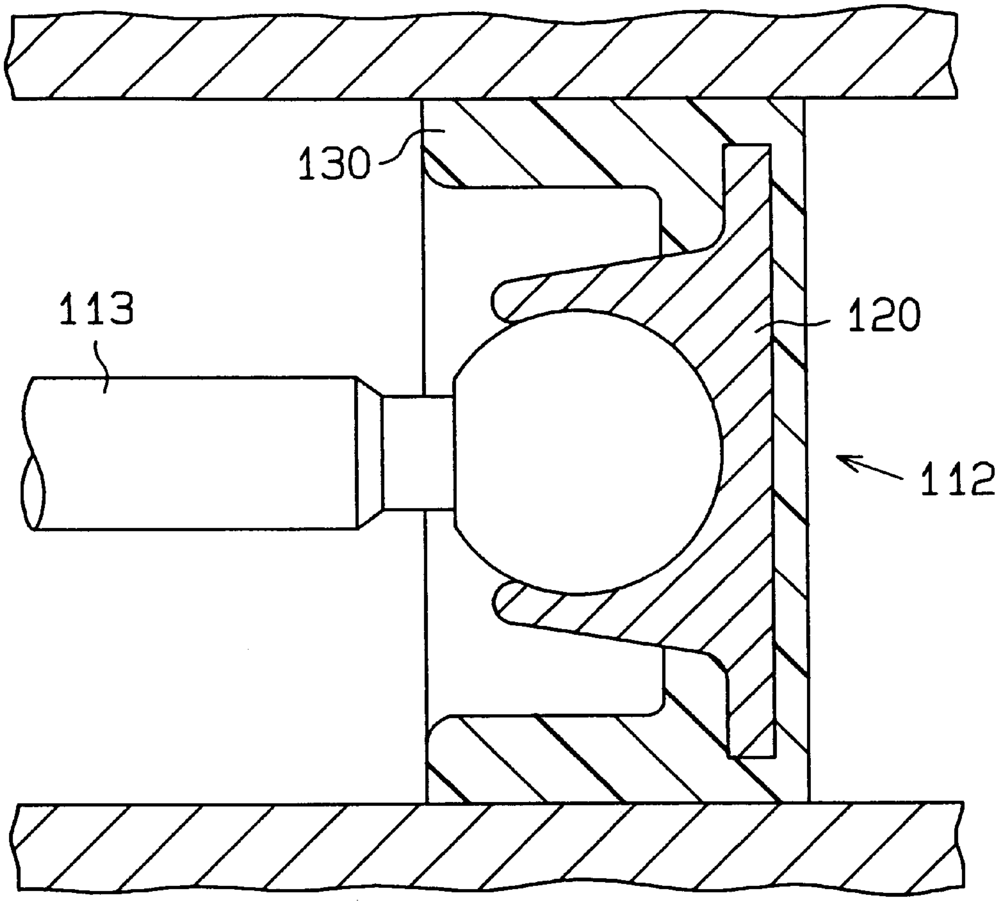
Fig.6 (Prior Art)
FIG. 6 is a cross-sectional view showing a prior art piston.

FIG. 5(*a*) shows the anchor 24 according to a second embodiment. Grooves 24*c* are formed in the peripheral surface of the disc 24*b* of the anchor 24 by a knurling tool. The grooves 24*c* may include first grooves that extend axially and second grooves that extend circumferentially.

FIG. 5(*b*) shows the anchor 24 according to a third embodiment. A spiral groove 24*d* centered about the axis S is formed in the peripheral surface of the disc 24*b*.

FIG. 5(*c*) shows the anchor 24 according to a fourth embodiment. Projections 24*e* are formed in the peripheral surface of the disc 24*b*. Recesses may be formed instead of the projections 24*e*.

The disks 24*b* shown in FIGS. 5(*a*)–5(*c*) limit rotation of the body 21 relative to the coupler 22. Accordingly, adhesion between the body 21 and the coupler is more stable.

The material for making the body 21 may contain molybdenum disulfide, which serves as a solid lubricant. This reduces friction by friction between the body 21 and the surface of the cylinder bore 12*a*.

Examples of thermosetting resins that may be used in the molding are an epoxy resin, an unsaturated polyester resin, a polyamidoimido resin, a urea resin, a melamine resin, an alkyd resin, a silicone resin, an urethane resin, and a furan resin.

Examples of reinforcing materials other than glass fibers that may be added to the resin are metal fibers, an alumina, carbon fibers, wood powders, an α-cellulose, shell powders, bone powders, and eggshell powders. Combinations of these materials may also be added to the resin material for the body 21.

Molding of the body 21 is not limited to injection molding. The body 21 may be molded by softening a granular or powder resin material in a mold. In this case, the coupler is inserted in the resin material and connected to the body 21. In other words, the body 21 may be molded by compression molding.

The present invention may be applied to a double-headed piston for double-headed piston compressors. In this case, thermosetting resin piston bodies are respectively connected to both end surfaces of a metal coupler.

The present invention may further be applied to a piston for wave cam compressors. In this case, a wave cam that serves as a drive plate forms a piston driving portion.

The present invention may further be embodied in other fluid machines such as oil pumps and air pumps.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A piston for cooperating with a driving body in a machine, the piston comprising:

a metal coupler formed from an aluminum alloy containing approximately 7 to 13 weight percent of silicon, the coupler connected to the driving body and having a first thermal expansion coefficient; and a body formed from a thermosetting resin molding material comprising a phenol resin and glass fiber, the thermosetting resin molding material containing approximately 15 to 65 weight percent of the glass fiber, wherein the body is molded to the coupler and has a second thermal expansion coefficient, the first thermal expansion coefficient substantially matching the second thermal expansion coefficient.

2. A piston for cooperating with a driving body in a machine, the piston comprising:

a metal coupler connected to the driving body and having a first thermal expansion coefficient; and a body made of thermosetting resin and having a second thermal expansion coefficient, wherein the body is molded to the coupler, the first thermal expansion coefficient substantially matching the second thermal expansion coefficient.

3. The piston according to claim 1, wherein a reinforcing material is added to the thermosetting resin to form a molding material.

4. The piston according to claim 2, wherein the reinforcing material is glass fiber.

5. The piston according to claim 4, wherein the molding material includes from 15 to 65 weight percent glass fiber.

6. The piston according to claim 1, wherein the thermosetting resin is a phenol resin.

7. The piston according to claim 6, wherein glass fiber is added to the phenol resin to form a molding material, wherein the molding material includes from 15 to 65 weight percent of the glass fiber.

8. The piston according to claim 1, wherein the coupler is made of an aluminum alloy containing from 7 to 13 weight percent of silicon.

9. The piston according to claim 1, wherein the coupler has an anchor for engaging the body, wherein the anchor prevents relative movement between the coupler and the body in the axial direction of the piston.

10. The piston according to claim 9, wherein the molding material of the body surrounds the anchor.

11. The piston according to claim 9, wherein the anchor includes a support shaft extending from the coupler and a flange located on the support shaft.

12. The piston according to claim 11, wherein one of a recess and a projection is formed on the flange to prevent relative rotation between the coupler and the body about the axis of the piston.

13. The piston according to claim 1, wherein the coupler has a rotation restrictor to prevent the piston from rotating about the axis of the piston.

14. A piston for cooperating with a swash plate in a compressor, the compressor having a drive shaft, rotation of the drive shaft converted into reciprocation of the piston through the swash plate and a pair of shoes, the piston comprising:

a metal coupler connected to the swash plate and having a first thermal expansion coefficient; and a body made of thermosetting resin and having a second thermal expansion coefficient, wherein the body is molded to the coupler, the first thermal expansion coefficient substantially matching the second thermal expansion coefficient.

15. A method of making a piston comprising:

molding a thermosetting resin forming a thermosetting resin body to a metal coupler, the thermal expansion coefficient of the thermosetting resin body substantially matching the thermal expansion coefficient of the metal coupler.

16. The method according to claim 15 including:

forming a molding material to be used in the molding by adding a reinforcing material to the thermosetting resin, and adjusting the proportion of reinforcing material in the molding material to alter the thermal expansion coefficient of the thermosetting resin body.

17. The method according to claim 16 including:

using a glass fiber as the reinforcing material.

18. The method according to claim 16 including:

adding from 15 to 65 weight percent of glass fiber to the thermosetting resin to form the molding material.

19. The method according to claim 15 including:

using a phenol resin as thermosetting resin.

20. The method according to claim 19 including:

forming a molding material to be used in the molding by adding from 15 to 65 weight percent of glass fiber to the phenol resin.

21. The method according to claim 15 including:

forming the coupler with an aluminum alloy containing from 7 to 13 weight percent of silicon.

* * * * *